US012773938B2

(12) United States Patent
Ekevid et al.

(10) Patent No.: US 12,773,938 B2
(45) Date of Patent: Oct. 27, 2026

(54) DUMP TRUCK

(71) Applicant: VOLVO CONSTRUCTION EQUIPMENT AB, Eskilstuna (SE)

(72) Inventors: Torbjörn Ekevid, Landsbro (SE); Peter Johansson, Växjö (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 77 days.

(21) Appl. No.: 18/815,983

(22) Filed: Aug. 27, 2024

(65) Prior Publication Data

US 2025/0074284 A1 Mar. 6, 2025

(30) Foreign Application Priority Data

Sep. 6, 2023 (EP) .................................... 23195698

(51) Int. Cl.
*B60G 17/015* (2006.01)
*B60P 1/04* (2006.01)
*B60P 1/16* (2006.01)

(52) U.S. Cl.
CPC .......... *B60P 1/045* (2013.01); *B60G 17/0155* (2013.01); *B60P 1/162* (2013.01)

(58) Field of Classification Search
None
See application file for complete search history.

(56) References Cited

U.S. PATENT DOCUMENTS

| | | | | |
|---|---|---|---|---|
| 11,299,869 | B2 | 4/2022 | Tomits | |
| 2011/0066336 | A1* | 3/2011 | Adolfson | B60K 28/08 701/50 |
| 2015/0151600 | A1* | 6/2015 | Suzuki | B60G 17/0565 280/5.514 |
| 2017/0368900 | A1 | 12/2017 | Kos et al. | |
| 2018/0162410 | A1 | 6/2018 | Skillsäter et al. | |
| 2019/0302794 | A1 | 10/2019 | Kean et al. | |
| 2020/0032488 | A1 | 1/2020 | Kean et al. | |

FOREIGN PATENT DOCUMENTS

| | | | |
|---|---|---|---|
| EP | 2291621 | B1 | 11/2020 |
| EP | 3918140 | B1 | 9/2022 |
| WO | 2019007533 | A1 | 1/2019 |

OTHER PUBLICATIONS

Extended European Search Report, European Application No. 23195698.8, mailed Feb. 13, 2024, 9 pages.

* cited by examiner

*Primary Examiner* — Lail A Kleinman
(74) *Attorney, Agent, or Firm* — Sage Patent Group

(57) ABSTRACT

The present disclosure relates to a dump truck, comprising a hydraulic suspension system, a wireless communication system, capable of receiving information from a loading equipment, and a control unit, comprising processing circuitry coupled to the hydraulic suspension system and the wireless communication system, the processing circuitry being configured to receive, from the loading equipment, information about a weight of a load to be received by a container of the dump truck, and control the hydraulic suspension system to raise the container to a height as a function of the weight of the load to be received.

15 Claims, 6 Drawing Sheets

DUMP TRUCK

CROSS REFERENCE TO RELATED APPLICATIONS

This application claims priority to European Patent Application No. 23195698.8, filed on Sep. 6, 2023, the disclosure and content of which is incorporated by reference herein in its entirety.

TECHNICAL FIELD

The disclosure relates generally to heavy-duty vehicles. In particular aspects, the disclosure relates to a dump truck. Dump trucks are vehicles equipped with a tipper basket. It includes construction equipment/off-road vehicles, such as rigid or articulated haulers, but also road vehicles, such as construction trucks or utility vehicles provided with such tipping function. Although the disclosure may be described with respect to a particular vehicle, the disclosure is not restricted to any particular vehicle.

BACKGROUND

Dump trucks are conventionally used for transporting material from a loading point/location to an unloading point/location. The material is transported in a container or tipper basket of the dump truck and is, for example, received from a loading equipment such as. an excavator or wheel loader.

The material received by the container of the dump truck may be of various size and weight. For instance, at a mining site, each received load of material may have a substantial weight and size. Hence, only a few loads of material may be received until the container is full. Also, each load of material may be released from an elevated position into the container, thereby increasing the impact force by gravity. Such release of heavy material from above the container may result in that the suspension cylinders of the dump truck are compressed to their minimum length, i.e. reach their end stop. This will in turn negatively affect the load carrying structure of the dump truck, which will be exposed to relatively high forces. There is thus a desire to manage the loading of heavy material into a dump truck in a better manner to reduce the risk of damaging the dump truck.

SUMMARY

According to a first aspect of the disclosure, there is provided a dump truck, comprising a hydraulic suspension system, a wireless communication system, capable of receiving information from a loading equipment, and a control unit, comprising processing circuitry coupled to the hydraulic suspension system and the wireless communication system, the processing circuitry being configured to receive, from the loading equipment, information about a weight of a load to be received by a container of the dump truck, and control the hydraulic suspension system to raise the container to a height as a function of the weight of the load to be received.

The first aspect of the disclosure may seek to solve the problems associated with loading of heavy material to a dump truck. A technical benefit may include that the hydraulic suspension system is prepared to receive the load from the loading equipment. Thus, when a load with a weight above the predetermined threshold limit is received by the dump truck, the hydraulic suspension system is controlled to handle such impact. Hereby, there is a reduced risk that e.g. hydraulic cylinders will be compressed to reach an end stop and thus a reduced risk that the load carrying structure will be exposed to damage caused by the heavy load.

The wireless communication system should be construed as a system configured to receive data wirelessly. The data comprises the information of the material to be loaded to the dump truck. As described above, the information contains the weight but may also contain other parameters, such as type of material, size, etc.

The function of the weight may, for example, be a linear function or a non-linear function. The function may alternatively be proportional or non-proportional to the weight of the load to be received. Further, the hydraulic suspension system may also be controlled to increase a pressure as a function of the weight of the load to be received, in particular when the container has been received to a height corresponding to a maximum height.

Optionally, in some examples, the processing circuitry may be configured to raise the container when the weight is above a predetermined threshold limit. A technical benefit may include that the hydraulic suspension system is only pre-activated for large loads, and not also for small, low-weight loads.

Optionally in some examples, the processing circuitry may be configured to control the hydraulic suspension system prior to the load being received by the container. A technical benefit may include that the hydraulic suspension system is given sufficient time to prepare for the load to be received from the loading equipment.

Optionally, in some examples, the processing circuitry may be configured to determine a desired position of the container relative to ground level, determine a displacement, relative to the desired position, of the container that would be caused by the load to be received by the container, determine, in response to the determined displacement, an amount of hydraulic fluid to feed to a hydraulic cylinder of the hydraulic suspension system to compensate for the displacement relative to the desired position caused by the load, and control the hydraulic suspension system such that a valve is arranged in an open position for a time period that allows the amount of hydraulic fluid to be fed to the hydraulic cylinder, the time period being determined so that the container is raised a distance corresponding to said displacement. A technical benefit may include that the container of the dump truck can be arranged at the desired position after the load is received, whereby the dump truck can be rapidly prepared to drive towards its target destination. Thus, the hydraulic system may not need to adjust the position of the container after receiving the load.

Optionally, in some examples, the hydraulic suspension system may further comprise a hydraulic accumulator and at least one hydraulic suspension cylinder, the hydraulic accumulator being arranged in fluid communication with the at least one hydraulic suspension cylinder. A technical benefit may include that the hydraulic cylinder, when being compressed by the load received from the loading equipment, can feed hydraulic fluid from a cylinder chamber of the hydraulic cylinder to the hydraulic accumulator. The hydraulic cylinder in combination with the hydraulic accumulator may thus act as a spring/damper for the container of the dump truck.

Optionally, in some examples, the processing circuitry may be further configured to control the hydraulic suspension system to feed hydraulic fluid from a hydraulic fluid source to the hydraulic accumulator in response to the amount of hydraulic fluid exceeding a maximum hydraulic fluid limit of the hydraulic suspension cylinder. A technical benefit may include that the hydraulic accumulator is pressurized such that the load received from the loading equipment can be properly handled by the hydraulic cylinder. Thus, if the hydraulic fluid required by the hydraulic cylinder to handle the load caused by the load received from the loading equipment, to position the container at the desired position, causes the hydraulic cylinder to obtain a maximum extended position, the hydraulic accumulator is pressurized with additional hydraulic fluid to assist in handling the load received from the loading equipment.

Optionally, in some examples, the processing circuitry may be further configured to determine, in response to the determined displacement, a minimum hydraulic pressure level in the accumulator required to arrange the container at the desired position after the container receives the load, and control the hydraulic suspension system to feed hydraulic fluid from the hydraulic fluid source to the hydraulic accumulator until the hydraulic pressure level in the hydraulic accumulator reaches the minimum hydraulic pressure level. A technical benefit may include, as indicated above, that the hydraulic accumulator in conjunction with the hydraulic actuator, can act as a damper. Thus, sufficient hydraulic fluid can be fed to the hydraulic accumulator to obtain the desired pressure level in the accumulator when the container receives the load. The hydraulic suspension system is thus pressure controlled, i.e. the pressure level in the hydraulic accumulator is controlled to obtain the desired position of the container when receiving the load.

Optionally, in some examples, the processing circuitry may be further configured to determine a position of the container relative to ground level after receiving the load, and control the hydraulic suspension system to drain hydraulic fluid in response to the position of the container relative to the ground level being higher than a desired position relative to ground level after receiving the load. A technical benefit may include that the container can be arranged at its desired position if it unexpectedly, after receiving the load, was positioned at a higher position than desired.

Optionally, in some examples, the processing circuitry may be further configured to determine a position of the container relative to ground level after receiving the load, and control the hydraulic suspension system in response to the position of the container relative to the ground level being lower than a desired position relative to ground level after receiving the load. A technical benefit may include that the container can be arranged at its desired position if it unexpectedly, after receiving the load, was positioned at a lower position than desired.

Optionally, in some examples, the hydraulic suspension system may further comprise a hydraulic pump configure to feed hydraulic fluid. A technical benefit may include that a rapid supply of pressurized hydraulic fluid can be fed to the hydraulic cylinder and/or the hydraulic accumulator. Optionally, in some examples, the hydraulic fluid source may be a hydraulic tank.

Optionally, in some examples, the dump truck may be a hauler vehicle. A hauler vehicle may be particularly advantageously operated at work sites where large loads are transported. Also, a hauler vehicle may advantageously comprise sufficiently large and heavy loads. Optionally, in some examples, the hauler vehicle may be an autonomous hauler vehicle.

According to a second aspect, there is provided a computer-implemented method of controlling a hydraulic suspension system for a dump truck, the method comprising determining, by processing circuitry of a computer system, a weight of a load to be received by a container of the dump truck; and controlling, by the processing circuitry, the hydraulic suspension system in response to the weight of the load being above a predetermined threshold limit.

Optionally, in some examples, the method may further comprise determining, by the processing circuitry, a desired position of the container relative to ground level, determining, by the processing circuitry, a displacement, relative to the desired position, of the container that would be caused by the load to be received by the container, determining, by the processing circuitry, in response to the determined displacement, an amount of hydraulic fluid to feed to a hydraulic cylinder of the hydraulic suspension system to compensate for the displacement relative to the desired position caused by the load, and controlling, by the processing circuitry, the hydraulic suspension system for a time period allowing the amount of hydraulic fluid to be fed to the hydraulic cylinder, the time period being determined so that the container is raised a distance corresponding to said displacement.

Optionally, in some examples, the method may further comprise determining, by the processing circuitry, a position of the container relative to ground level after receiving the load, and controlling, by the processing circuitry, a drain valve of the hydraulic suspension system to be arranged in an open position to drain hydraulic fluid to a drain tank in response to the position of the container relative to the ground level being higher than a desired position relative to ground level.

Optionally, in some examples, the method may further comprise determining, by the processing circuitry, the weight of the load to be received by the container from processing circuitry of a loading equipment having a bucket comprising the load.

Optionally, in some examples, the loading equipment may comprise a weight sensor for detecting the weight of the load in the bucket. A technical benefit may include that the weight of the load to be received by the container can be quickly obtained.

Further effects and features of the second aspect are largely analogous to those described above in relation to the first aspect. Thus, any feature of the first aspect can be combinable with the features of the second aspect. In a similar vein, any feature of the second aspect can be combinable with the features of the first aspect.

According to a third aspect, there is provided a computer program product comprising program code for performing, when executed by the processing circuitry, the method of any of the examples described above in relation to the second aspect.

According to a fourth aspect, there is provided a non-transitory computer-readable storage medium comprising instructions, which when executed by the processing circuitry, cause the processing circuitry to perform the method of any of the examples described above in relation to the second aspect.

Effects and features of the third and fourth aspects are largely analogous to those described above in relation to the first and second aspects.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The disclosure described in the following may seek to reduce the risk of damaging the load carrying structure of a dump truck when the dump truck is loaded with heavy material. A technical benefit may include that the dump truck is prepared for the load to be received from a loading equipment. Thus, the operational lifetime of the dump truck can be increased.

Figure 1:
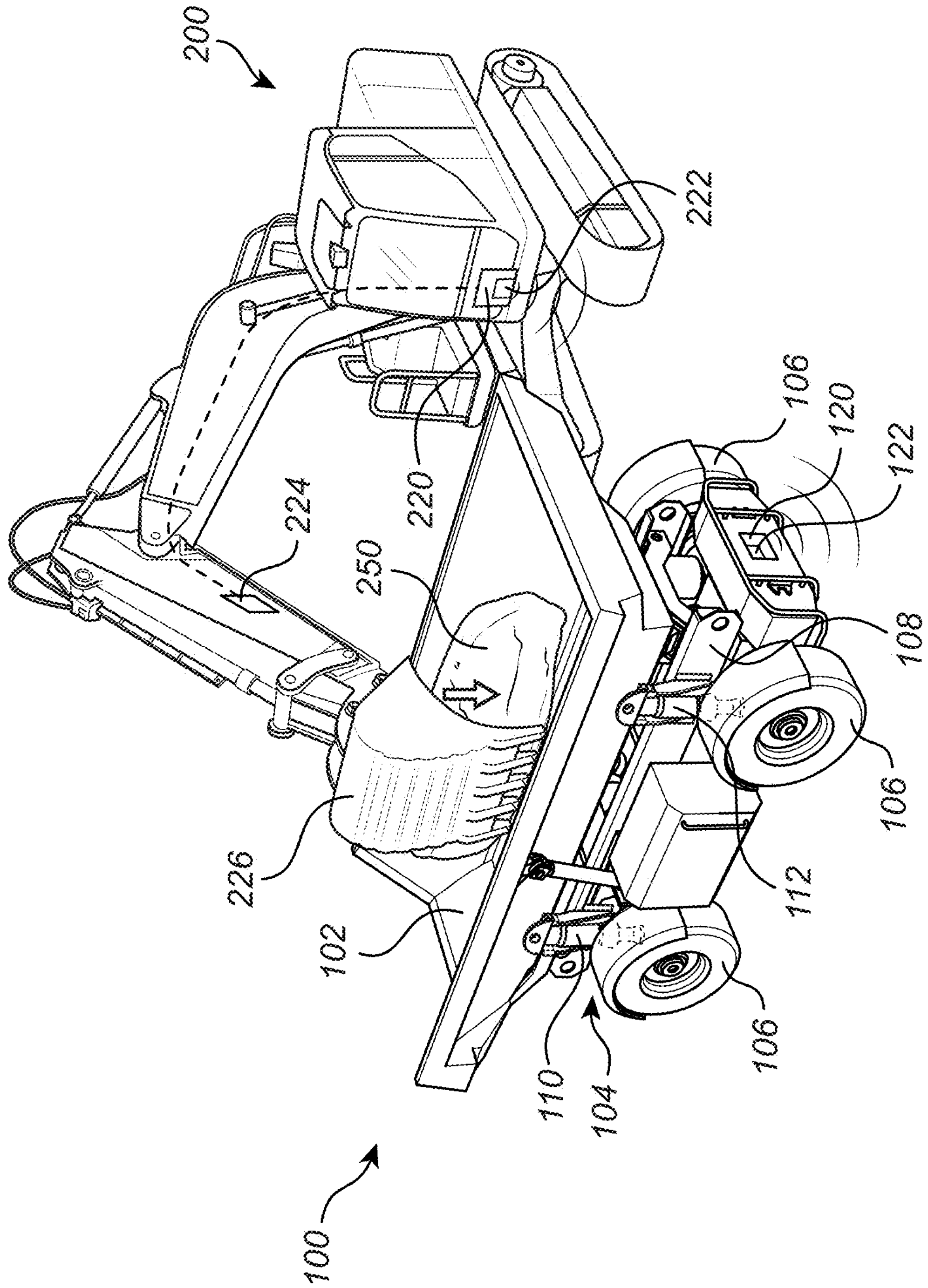
FIG. 1 is an exemplary illustration of a dump truck according to an example.

Turning to FIG. 1 which is an exemplary illustration of a dump truck 100 according to an example. Generally speaking, a dump truck designates any vehicle equipped with an open-box bed (i.e. the 'container' or 'tipper basket'), which is hinged at the rear and equipped with hydraulic rams to lift the front, allowing the material in the bed to be deposited ("dumped") on the ground behind the truck at the site of delivery. As a result, it can designate a construction equipment, such as an articulated hauler or a rigid hauler, that is a vehicle mainly used off-road on construction sites or mining. However, it can also designate a road vehicle, which is not limited to off-road areas, such as construction trucks and utility vehicles.

The exemplified dump truck 100 is a rigid hauler vehicle (also known as 'rigid hauler'), and more particularly an autonomously rigid hauler vehicle. Thus, the autonomous hauler vehicle does not contain a cabin for an operator but is instead controlled autonomously. The hauler may be controlled remotely from e.g. communication station, etc.

FIG. 1 also exemplifies a loading equipment 200. The loading equipment 200 is exemplified as an excavator operated in conjunction with the dump truck 100. In particular, the loading equipment 200 loads material, i.e. a load 250, to the dump truck 100, whereby the dump truck 100 subsequently transports the load 250 to an unloading point/location, such as e.g. a crusher or other types of work sites.

The dump truck 100 comprises a container or tipper basket 102. The container 102 is configured to receive the load 250 from the loading equipment 200, and to carry the load 250 to an unloading point/location. The dump truck 100 further comprises a hydraulic suspension system 104. An example of the hydraulic suspension system 104 is described in further detail below with reference to FIG. 3. The hydraulic suspension system 104 is configured to support wheels 106 of the dump truck 100 relative to a frame/chassis 108 of the dump truck 100. As is exemplified in FIG. 1, the hydraulic suspension system 104 comprises hydraulic cylinders 110, 112 arranged between the frame 108 and the wheels 106. In particular, the hydraulic cylinders 110, 112 are connected to the frame 108 and may be connected to a wheel axle supporting the wheels. Cushions may be arranged between the container 102 and the frame 108. Thus, the dump truck 100 is allowed to be loaded with relatively large and heavy loads 250, such as rocks, for transportation to the unloading point/location.

The dump truck 100 further comprises a control unit 120. The control unit 120 comprises processing circuitry configured to e.g. control various functionalities of the dump truck 100. In particular, the processing circuitry is coupled to the hydraulic suspension system 104. The processing circuitry is thus configured to control the hydraulic suspension system 104 as will be described in further detail below.

When the dump truck 100 is about/close to receive the load 250 from the loading equipment 200, the load 250 may, for example, be dropped from an elevated position above the container 102 and/or may be large and heavy. For such examples, the hydraulic suspension system 104 may be exposed to such an impact that the load from the container 102 is transmitted to the frame 108 of the dump truck 100. Hence, the hydraulic suspension system 104 may not be able to absorb the impact force of the load 250.

To avoid such scenario, a wireless communication system 122 can advantageously be implemented in the dump truck 100. For example, the wireless communication system to which it is referred to can be internet protocol, Bluetooth, radio, etc. The wireless communication system 122 is coupled to the processing circuitry. As an alternative, the wireless communication system 122 may form an integrated part of the control unit 120. In the example depicted in FIG. 1, the loading equipment 200 also comprises a control unit 220 provided with a wireless communication device 222. The wireless communication system 122 of the dump truck 100 is thus capable of receiving information from the loading equipment 200. In further detail, the wireless communication system 122 of the dump truck 100 is operable to receive information from the wireless communication system 222 of the loading equipment 200. The information may comprise details about the weight of the load 250 that is about to be loaded to the container 102. The information may additionally comprise details at which elevation the load 250 is dropped into the container 102. As further exemplified in FIG. 1, the loading equipment 200 may comprise a weight sensor 224 which is merely schematically depicted as arranged on a boom of the loading equipment 200. The weight sensor 224 is coupled to the control unit 220 of the loading equipment 200 and configured to detect the weight of the load in a bucket 226 of the loading equipment 200. The weight sensor 224, or another sensor, may also detect an elevation of the bucket relative to ground level. Considering that the height of the open-box bed relative to ground surface is a known parameter, the control unit of the dump truck 100 can deduce the height at which load is released relative to the bed or bottom of the container (and not relative to the ground).

When the wireless communication system 122 receives the information about the weight of the load 250 to be received by the container 102, the processing circuitry can control the hydraulic suspension system. In particular, the hydraulic suspension system 104 is controlled in response to the weight of the load being above a predetermined threshold limit. Thus, if the weight of the load 250 is too high, which could result in the frame 108 of the dump truck being exposed to high stresses, the hydraulic suspension system 104 is controlled, and may be controlled in advance, i.e. before the load 250 is received in the container 102. In other words, the hydraulic suspension system 104 is prepared for the heavy load 250 loaded by the loading equipment 200. As will be described in further detail below with reference to FIG. 3, the hydraulic suspension system 104 may comprise hydraulic cylinders supporting the wheels 106 of the dump truck 100. In such an example, the hydraulic system 104 may be controlled to feed liquid to the hydraulic cylinders in such a manner that, when the container 102 receives the load 250, the hydraulic cylinder may not be compressed to their maximum ability.

Figure 2:
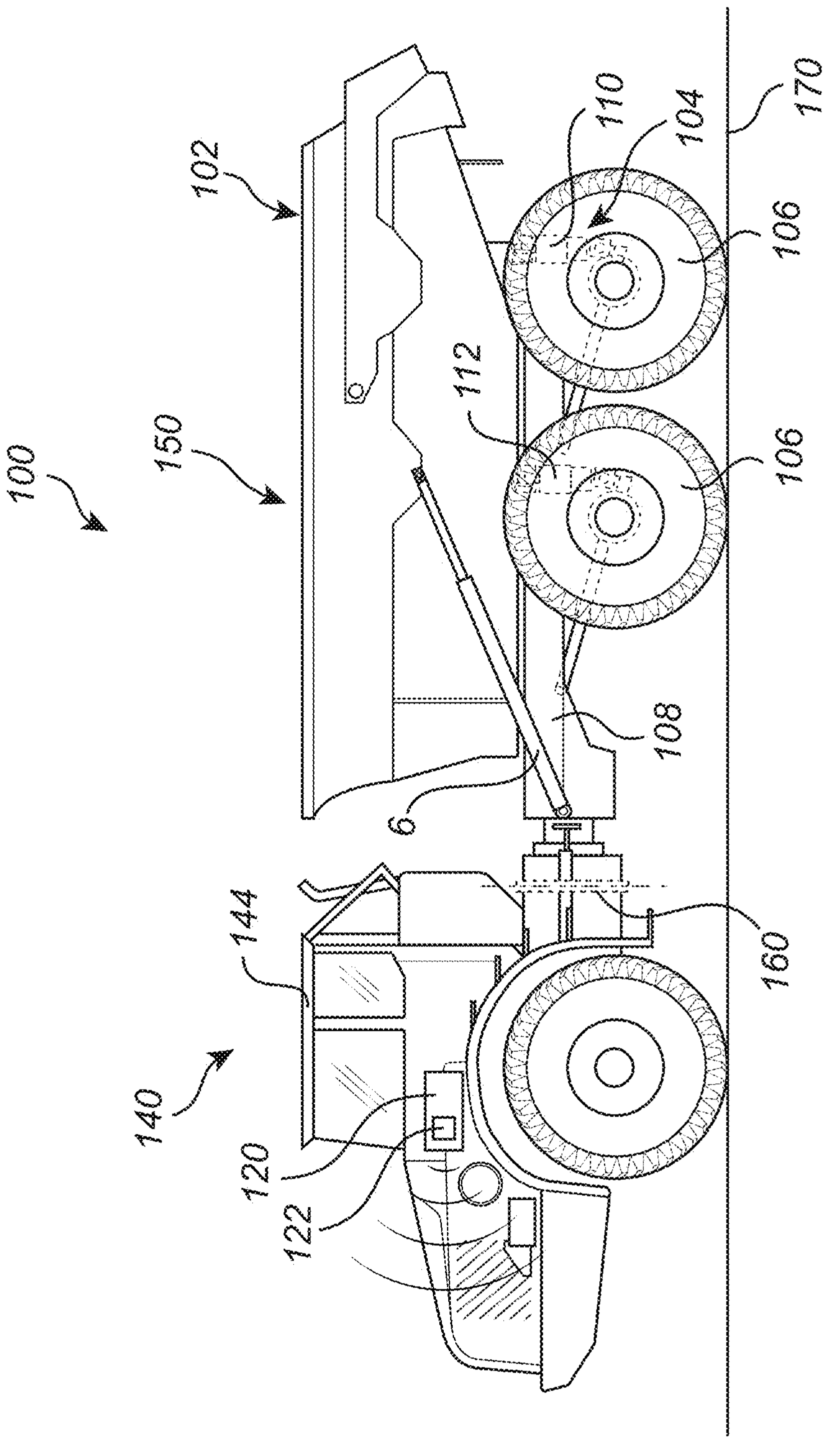
FIG. 2 is an exemplary illustration of a dump truck according to another example.

Reference is now made to FIG. 2 which is an exemplary illustration of a dump truck 100 according to another example. In detail, the dump truck 100 in FIG. 2 is exemplified as an articulated hauler vehicle. The exemplified articulated hauler vehicle is manually operatable, i.e. an operator (not shown) is occupying a cabin 144 for driving and controlling actions performed by the articulate hauler vehicle. The articulated hauler vehicle comprises a front portion 140, which comprises the cabin 144, and a rear portion 150 comprising the container 102. The front 140 and rear 150 portions are connected to each other at an articulation joint 160.

The articulated hauler vehicle in FIG. 2 further comprises a hydraulic suspension system 104 configured to support the wheels axle 106 relative to the frame/chassis 108. Also, the exemplified articulated hauler vehicle comprises the above described control unit 120 as well as the wireless communication system 122. The loading equipment 200 depicted in FIG. 1 is omitted from the exemplified illustration in FIG. 2 but it should be readily understood that the wireless communication system 122 in the articulated hauler vehicle in FIG. 2 communicates with the wireless communication system of the loading equipment in the same manner as described above in relation to FIG. 1.

Advantageously, the processing circuitry of the dump truck in each of FIGS. 1 and 2 can calculate/predict a vertical displacement of the container/tipping basket relative to the ground based on the load weight that is about to be released into the container and possibly also based on the height at which the load is released relative to the container bed surface. In response or in anticipation, the processing circuitry may advantageously control the hydraulic suspension system 104 to raise the container/tipping basket before the load 250 is released, by extending the hydraulic cylinders, so that, after the load 250 is released, the container reaches a target position/height relative to the ground surface.

By determining the height at which the load is released, the forces acting on the container, and hence the suspension system can be determined. In detail, the forces acting on the container is the mass times the acceleration of the load when arriving at the container. Hereby, a dynamic displacement of the container can be predicted, whereby the hydraulic suspension system can raise the container to avoid the dynamic loads to negatively affect the vehicle frame.

Figure 3:
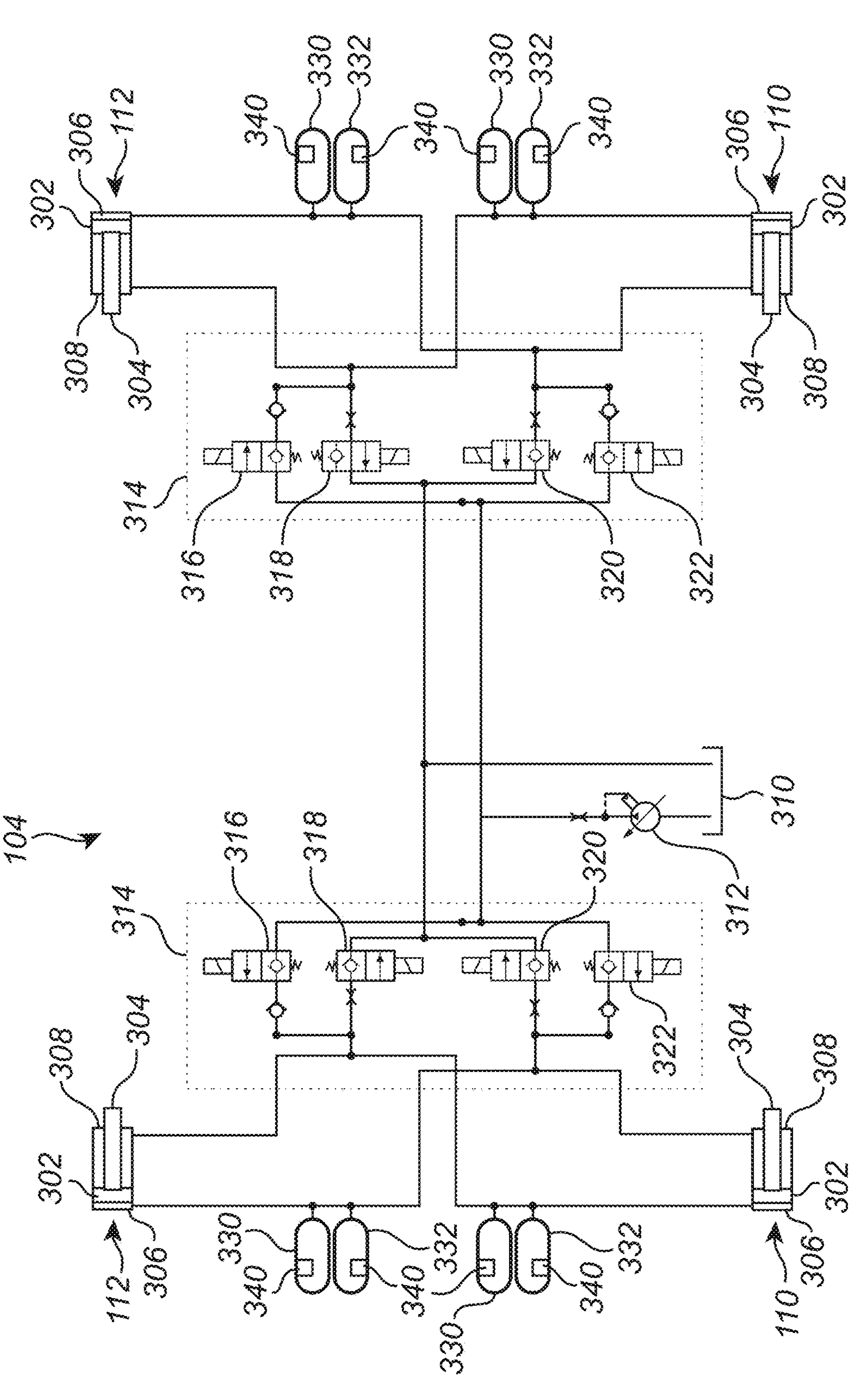
FIG. 3 is an exemplary illustration of a hydraulic suspension system according to an example.

In order to describe a non-limiting example of the hydraulic suspension system 104, reference is now made to FIG. 3. FIG. 3 is an exemplary illustration of a hydraulic suspension system according to an example and comprises the above described hydraulic cylinders 110, 112. As can be seen in FIG. 3, the hydraulic cylinders 110, 112 are depicted for both sides of the dump truck 100. As such, the hydraulic cylinders suspending the rear wheels are denoted with reference numeral 110, while the hydraulic cylinders suspending the front wheels are denoted with reference numeral 112.

The hydraulic cylinders 110, 112 each comprises a piston 302 connected to a piston rod 304. The following will describe an example where the piston rod 304 is connected to the wheel axles (not shown), which in turn is connected to the wheels 106. It should however be readily understood that the piston rod 304 instead is connected to the frame/chassis 108 of the dump truck 100. The hydraulic cylinders 110 and 112 each comprise a piston side 306 and a piston rod side 308 into which hydraulic fluid is feed, or from which hydraulic fluid is drained.

The hydraulic suspension system 104 further comprises a hydraulic fluid source 310. The hydraulic fluid source 310 is e.g. a tank containing a liquid. The hydraulic fluid source 310 may also act as a drain tank to receive hydraulic fluid from the hydraulic cylinders 110, 112. Further, a hydraulic pump 312 is arranged in fluid communication with the hydraulic fluid source 310 and the hydraulic cylinders 310, 312 via a valve arrangement 314. The valve arrangement 314 is exemplified as comprising a plurality of valves 316, 318, 320, 322. Further, the hydraulic suspension system 104 is also exemplified as comprising hydraulic accumulators 330, 332. The hydraulic accumulators 330, 332 are exemplified as arranged in fluid communication with the piston side 306 of the hydraulic cylinders 110, 112. The hydraulic accumulator 330, 332 are further exemplified as comprising hydraulic pressure sensors 340 for detecting a hydraulic pressure level in the hydraulic accumulators. The hydraulic suspension system 104 depicted in FIG. 3 should be understood as being schematic and could of course comprise further components such as additional sensors, valves conduits, etc.

The following will describe the functionality of the hydraulic suspension system in FIG. 3 solely with reference to the front hydraulic cylinder 112 for simplifying for the skilled reader. It should however be readily understood that the functionality is similar for controlling the rear hydraulic cylinder 110. When there is a desire to raise the hydraulic cylinder 112 to prepare for the weight of the load 250, hydraulic fluid is fed from the hydraulic fluid source 310 to the piston side 306 of the hydraulic cylinder 112. In detail, the hydraulic pump 312 pumps the hydraulic fluid from the hydraulic fluid source 310 towards the valve 322. The valve 322 is controlled to be arranged in an open position to allow hydraulic fluid to flow therethrough, whereby hydraulic fluid will be provided to the piston side 306 of the hydraulic cylinder 112, thereby pushing the piston rod 304 to extend out from the hydraulic cylinder chamber, thereby raising the container 102 relative to ground level.

As is evident from the exemplified illustration in FIG. 3, hydraulic fluid may also be directed from the hydraulic pump 312 and into the hydraulic accumulators 330, 332. Similarly, when there is a desire to feed hydraulic fluid to the piston side 306, the hydraulic fluid can be fed from the hydraulic accumulators 330, 332 and into the piston side 306. Before the hydraulic cylinder reaches a maximum position, hydraulic fluid may be filling the hydraulic cylinder. After reaching the maximum position, hydraulic fluid is fed into the hydraulic accumulator for pressurizing a gas volume in the hydraulic accumulator 330, 332, whereby the pressure in the accumulator is increased.

When, on the other hand, there is a desire to drain hydraulic fluid from the piston side 306 of the hydraulic cylinder 112, hydraulic fluid can be fed from the piston side 306 to the hydraulic accumulator 330, 332. Alternatively, or in addition, hydraulic fluid can be fed from the piston side 306 of the hydraulic cylinder 112 to the hydraulic fluid source 310 via valve 320. If the hydraulic cylinder is arranged at its maximum position when draining, the hydraulic accumulator 330, 332 may advantageously be drained before draining the hydraulic cylinder 112. The pressure in the accumulator 330, 332 will hereby be reduced. When the load is received and the hydraulic cylinder 112 is compressed, the hydraulic accumulator may be further drained from hydraulic fluid when the hydraulic cylinder reaches a minimum length.

The hydraulic suspension system 104 described above in relation to FIG. 3 may thus advantageously be controlled to supply liquid to the hydraulic cylinder 110, 112 in anticipation/prevision to the weight of the load 250 to be received. Thus, liquid is fed to the piston sides of the hydraulic cylinders when the weight of the load 250 is too high in order to prepare the hydraulic suspension system for the impact of such high weight. Further, the weight of the load 250 may correspond to a pressure that the hydraulic cylinders will be exposed to when receiving the load. The amount of fluid to be fed to the hydraulic cylinders may advantageously be measured in relation to a pressure level in the hydraulic cylinders and/or in the accumulators. The pressure level may be measured in the hydraulic cylinders, or in the vicinity of the hydraulic cylinders. Alternatively, or additionally, the pressure level may be measured in the accumulators, or in the vicinity of the hydraulic accumulators.

Figure 4:
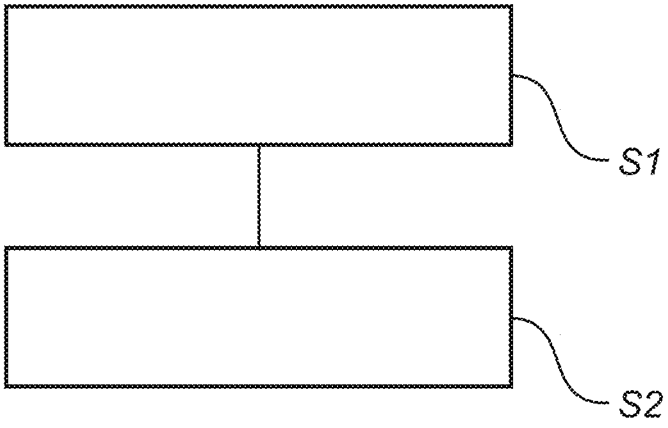
FIG. 4 is an exemplary illustration of a flow chart of controlling a hydraulic suspension system of a dump truck according to an example.

In order to describe the method of controlling the hydraulic suspension system 104 of the dump truck 100, reference is made to FIG. 4. FIG. 4 is an exemplary illustration of a flow chart of controlling a hydraulic suspension system of a dump truck according to an example. As described above, the processing circuitry of the control unit 120 receives S1 information from the loading equipment 200. The information is about the weight of the load 250 to be received by the container 102 of the dump truck 100. In other words, the control unit receives information of the weight, i.e. how much the load 250 weights. The processing circuitry thereafter, in response to the information of the weight, if the weight is above a predetermined threshold limit, controls S2 the hydraulic suspension system 104. According to the example depicted in FIG. 3, the hydraulic suspension system 104 may be controlled to feed hydraulic fluid to the piston side 306 of each of the hydraulic cylinders 110, 112.

Further, the processing circuitry may also be configured to determine a desired/target position or height of the container 102 relative to ground level. In particular, the desired position may be a position, or ride height of the container which is suitable for the upcoming mission of the dump truck when driving to e.g. an unloading point/location. A displacement of the container 102 relative to the ground level may be determined or estimated by the processing circuitry. The displacement is thus determined or estimated in advance, i.e. estimated in response to the weight of the load 250 to be received by the container 102. The processing circuitry may determine an amount of liquid to be fed to the hydraulic cylinder in order to raise the container such that, when the load 250 is arranged in the container 102, the container 102 lowers until exactly the target/desired ride height or position. In order to control hydraulic fluid to flow to the hydraulic cylinder 110, 112, at least one valve may be arranged in an open position.

When an amount of liquid to be fed to the hydraulic cylinder exceeds a maximum hydraulic fluid limit of the hydraulic cylinder, liquid fills the hydraulic accumulator 330, 332. Also, and in response to the above determined displacement, a minimum hydraulic pressure level in the accumulator 330, 332 may be determined. In particular, the minimum hydraulic pressure level may be set such that the container 102 is arranged at the desired position when receiving the load 250. Hydraulic fluid is thus fed to the hydraulic accumulator 330, 332 until the hydraulic pressure level in the hydraulic accumulator reaches the minimum hydraulic pressure level. The pressure level in the hydraulic accumulator 330, 332 may, for example, be determined by the above described hydraulic pressure sensor 340.

As described above, hydraulic fluid may also be drained from the hydraulic cylinders 110, 112 to the hydraulic fluid source 310, for example, if the container 102, after receiving the load 250, remains higher than the desired position. In such a case, the processing circuitry may control the hydraulic suspension system 104 to drain hydraulic fluid to the hydraulic fluid source 310 such that the container 104 is subsequently arranged at the desired position. In a similar vein, if the container 102, after receiving the load 250 is arranged at a lower position compared to the desired position, the processing circuitry may control the hydraulic suspension system 104 to feed further hydraulic fluid to the hydraulic cylinders 110, 112 such that the container 104 is subsequently arranged at the desired position.

Figure 5A:
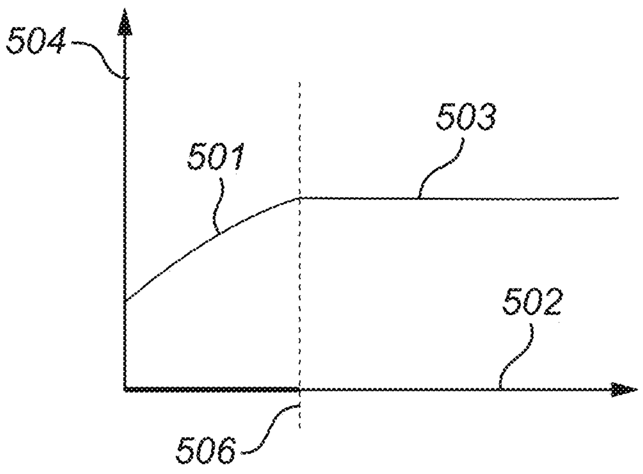
FIGS. 5A-5B are exemplified graphs of stroke in a hydraulic cylinder and pressure in a hydraulic accumulator.
Figure 5B:
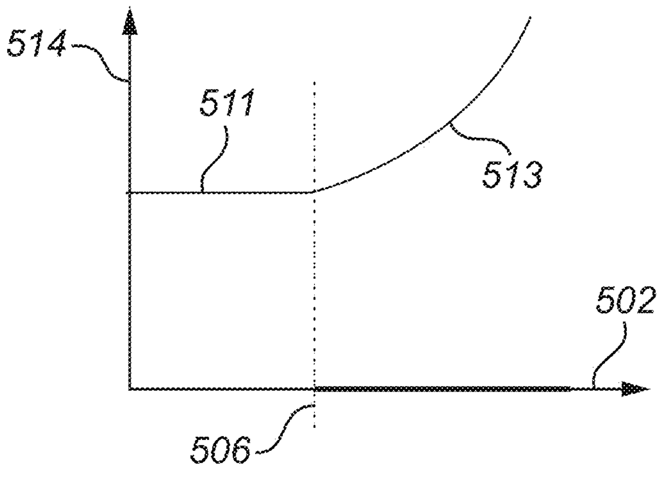

Reference is now made to FIGS. 5A-5B which are exemplified and schematic graphs of stroke in a hydraulic cylinder (FIG. 5A) and pressure in a hydraulic accumulator (FIG. 5B). In FIG. 5A, the abscissa axis 502 represents the load in the container, while the ordinate axis 504 represents the stroke of a hydraulic cylinder. As can be seen, the stroke of the cylinder is increasing 501 as a function of the load, until the load exceeds a predetermined threshold limit 506. When the weight of the load is higher than the threshold limit 506 the hydraulic cylinder cannot extend anymore and the stroke remains at a constant level 503.

In FIG. 5B on the other hand, the ordinate axis represents the pressure level in a hydraulic accumulator. The abscissa axis 502 is, similar to FIG. 5A, representing the load in the container, and the predetermined threshold limit 506 is the same as in FIG. 5A. As can be seen, a load up to the predetermined threshold limit 506 will not affect the pressure level in the accumulator, which is maintained as a constant level 511. However, when the load is higher than the predetermined threshold limit 506, the pressure level in the accumulator will increase as a function of the load, i.e. the pressure will increase as the load increase.

The stroke of the hydraulic cylinder can be calculated according to the following.

$$p = p_s + \frac{\Delta F}{A_p} \tag{1}$$

$$p_s = \frac{F_s}{A_p} \tag{2}$$

Where:

p=pressure in an accumulator after the container receives the load, $p_s$=static pressure of the accumulator before receiving the load, ΔF=added mass to the cylinder, $A_p$=Area of piston rod.

According to the ideal gas law, the following equations can be formulated:

$$V_s = \frac{p_0 V_0 T}{p_s T_0} \quad (3)$$

$$V = \frac{p_0 V_0 T}{p T_0} \quad (4)$$

Where:

$V_s$=static gas volume in the accumulator, $V_0$=volume of the accumulator,

V=volume corresponding to the total load, i.e. eigen weight and added mass from the load, $p_0$=gas pressure in the accumulator, Further, the following equations can be formulated:

$$V_1 = V_0 - V \quad (5)$$

$$\Delta V = V_s - V \quad (6)$$

Where:

$V_1$=the current liquid volume in the accumulator,

ΔV=difference in liquid volume after receiving the load.

The stroke S* can by the above equations (1)-(6) be determined by:

$$S^* = \frac{\Delta V}{A_p} \quad (7)$$

When on the other hand the stroke exceeds the predetermined threshold limit 506 described above in relation to FIGS. 5A and 5B, the pressure to obtain in the accumulator can determined according to the following, where equations (1)-(5) still apply.

Instead of equation (6), equation (8) below is formulated.

$$V_g = V_0 + A_p s_{max} \quad (8)$$

Where:

$V_g$=the gas volume required by the accumulator before receiving the load, $S_{max}$=maximum stroke of cylinder from its position before the container receives the load.

From equations (1)-(5) and (8), the required pressure P* for the accumulator can be formulated as:

$$P^* = \frac{p_0 V_0 T}{V_g T_0} \quad (9)$$

Where:

T=temperature in the accumulator after the container receives the load, $T_0$=temperature in the accumulator before the container receives the load.

Figure 6:
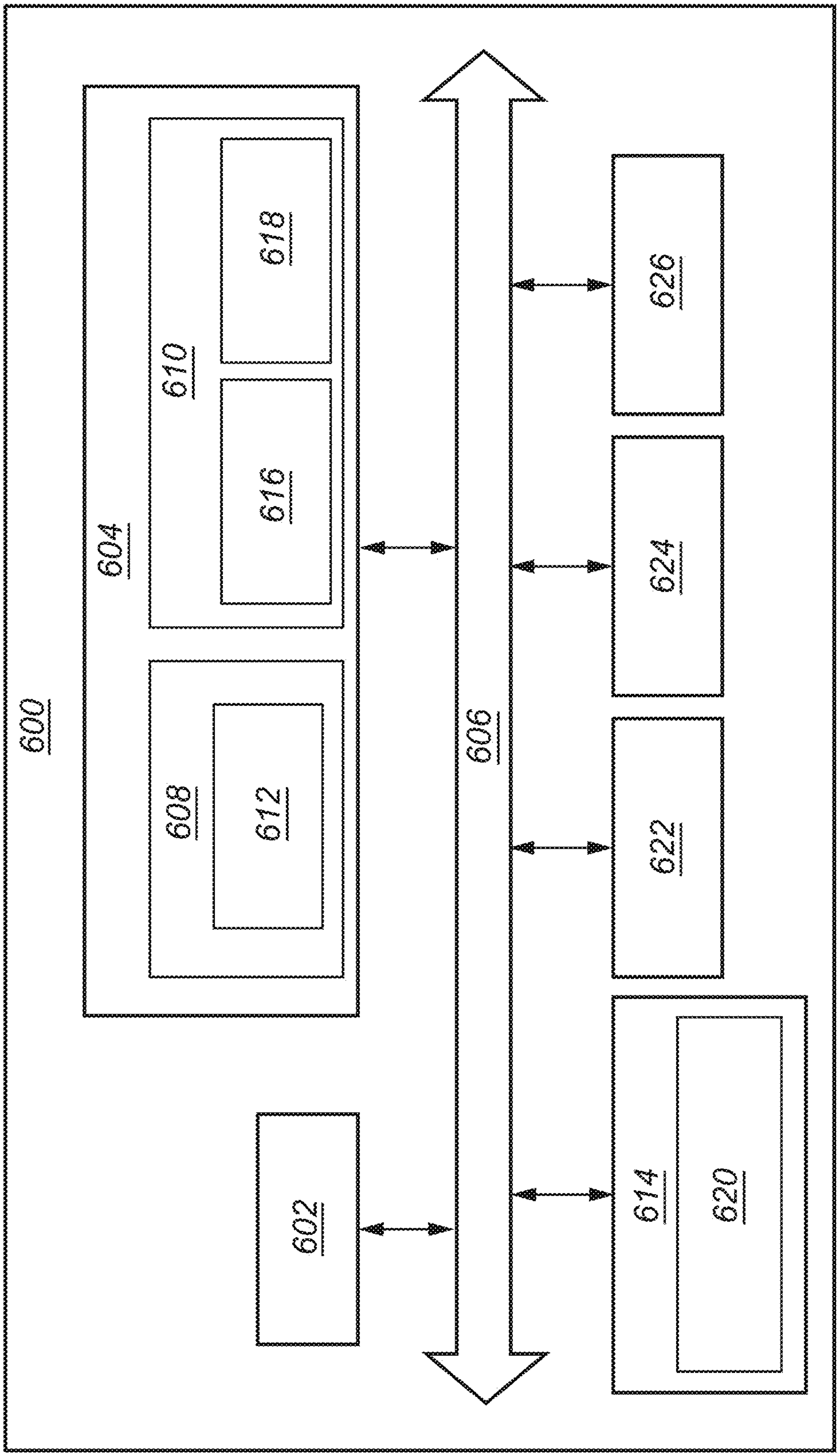
FIG. 6 is a schematic diagram of an exemplary computer system for implementing examples disclosed herein, according to an example.

Turning now to FIG. 6 which is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example List

Example 1: A dump truck, comprising: a hydraulic suspension system, a wireless communication system, capable of receiving information from a loading equipment, and a control unit, comprising processing circuitry coupled to the hydraulic suspension system and the wireless communication system, the processing circuitry being configured to: receive, from the loading equipment, information about a weight of a load to be received by a container of the dump truck, and control the hydraulic suspension system to raise the container to a height as a function of the weight of the load to be received.

Example 2. The dump truck of example 1, wherein the processing circuitry is configured to raise the container when the weight is above a predetermined threshold limit.

Example 3. The dump truck of any one of examples 1 or 2, wherein the processing circuitry is configured to control the hydraulic suspension system prior to the load being received by the container.

Example 4. The dump truck of any one of the preceding examples, wherein the processing circuitry is configured to: determine a desired position of the container relative to ground level, determine a displacement, relative to the desired position, of the container that would be caused by the load to be received by the container, determine, in response to the determined displacement, an amount of hydraulic fluid to feed to a hydraulic cylinder of the hydraulic suspension system to compensate for the displacement relative to the desired position caused by the load, and control the hydraulic suspension system such that a valve is arranged in an open position for a time period that allows the amount of hydraulic fluid to be fed to the hydraulic cylinder, the time period being determined so that the container is raised a distance corresponding to said displacement.

Example 5. The dump truck of any one of the preceding examples, wherein the hydraulic suspension system further comprises a hydraulic accumulator and at least one hydraulic suspension cylinder, the hydraulic accumulator being arranged in fluid communication with the at least one hydraulic suspension cylinder.

Example 6. The dump truck of example 5 when dependent on example 3, the processing circuitry being further configured to: control the hydraulic suspension system to feed hydraulic fluid from a hydraulic fluid source to the hydraulic accumulator in response to the amount of hydraulic fluid exceeding a maximum hydraulic fluid limit of the hydraulic suspension cylinder.

Example 7. The dump truck of example 6, wherein the processing circuitry is further configured to: determine, in response to the determined displacement, a minimum hydraulic pressure level in the accumulator required to arrange the container at the desired position after the container receives the load, and control the hydraulic suspension system to feed hydraulic fluid from the hydraulic fluid source to the hydraulic accumulator until the hydraulic pressure level in the hydraulic accumulator reaches the minimum hydraulic pressure level.

Example 8. The dump truck of any one of the preceding examples, the processing circuitry being further configured to: determine a position of the container relative to ground level after receiving the load, and control the hydraulic suspension system to drain hydraulic fluid in response to the position of the container relative to the ground level being higher than a desired position relative to ground level after receiving the load.

Example 9. The dump truck of any one of the preceding examples, the processing circuitry being further configured to: determine a position of the container relative to ground level after receiving the load, and control the hydraulic suspension system in response to the position of the container relative to the ground level being lower than a desired position relative to ground level after receiving the load.

Example 10. The dump truck of any one of the preceding examples, the hydraulic suspension system further comprising a hydraulic pump configure to feed hydraulic fluid.

Example 11. The dump truck of example 6, wherein the hydraulic fluid source is a hydraulic tank.

Example 12. The dump truck of any one of the preceding examples, wherein the dump truck is a hauler vehicle.

Example 13. The dump truck of example 12, wherein the hauler vehicle is an autonomous hauler vehicle.

Example 14. A computer-implemented method of controlling a hydraulic suspension system for a dump truck, the method comprising: determining, by processing circuitry of a computer system, a weight of a load to be received by a container of the dump truck; and controlling, by the processing circuitry, the hydraulic suspension system to raise the container a height as a function of the weight of the load to be received.

Example 15. The method of example 14, further comprising: determining, by the processing circuitry, a desired position of the container relative to ground level, determining, by the processing circuitry, a displacement, relative to the desired position, of the container that would be caused by the load to be received by the container, determining, by the processing circuitry, in response to the determined displacement, an amount of hydraulic fluid to feed to a hydraulic cylinder of the hydraulic suspension system to compensate for the displacement relative to the desired position caused by the load, and controlling, by the processing circuitry, the hydraulic suspension system for a time period allowing the amount of hydraulic fluid to be fed to the hydraulic cylinder, the time period being determined so that the container is raised a distance corresponding to said displacement.

Example 16. The method of any one of examples 14 or 15, further comprising: determining, by the processing circuitry, a position of the container relative to ground level after receiving the load, and controlling, by the processing circuitry, a drain valve of the hydraulic suspension system to be arranged in an open position to drain hydraulic fluid to a drain tank in response to the position of the container relative to the ground level being higher than a desired position relative to ground level.

Example 17. The method of any one of examples 14-16, further comprising: determining, by the processing circuitry, the weight of the load to be received by the container from processing circuitry of a loading equipment having a bucket comprising the load.

Example 18. The method of example 17, wherein the loading equipment comprises a weight sensor for detecting the weight of the load in the bucket.

Example 19. A computer program product comprising program code for performing, when executed by the processing circuitry, the method of any of examples 14-18.

Example 20. A non-transitory computer-readable storage medium comprising instructions, which when executed by the processing circuitry, cause the processing circuitry to perform the method of any of examples 14-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A dump truck, comprising:

a hydraulic suspension system, a wireless communication system, capable of receiving information from a loading equipment, and a control unit, comprising processing circuitry coupled to the hydraulic suspension system and the wireless communication system, the processing circuitry being configured to:

receive, from the loading equipment, information about a weight of a load to be received by a container of the dump truck, and control the hydraulic suspension system to raise the container to a height as a function of the weight of the load to be received.

2. The dump truck of claim 1, wherein the processing circuitry is configured to raise the container when the weight is above a predetermined threshold limit.

3. The dump truck of claim 1, wherein the processing circuitry is configured to control the hydraulic suspension system prior to the load being received by the container.

4. The dump truck of claim 1, wherein the processing circuitry is configured to:

determine a desired position of the container relative to ground level, determine a displacement, relative to the desired position, of the container that would be caused by the load to be received by the container, determine, in response to the determined displacement, an amount of hydraulic fluid to feed to a hydraulic cylinder of the hydraulic suspension system to compensate for the displacement relative to the desired position caused by the load, and control the hydraulic suspension system such that a valve is arranged in an open position for a time period that allows the amount of hydraulic fluid to be fed to the hydraulic cylinder, the time period being determined so that the container is raised a distance corresponding to said displacement.

5. The dump truck of claim 4, wherein the hydraulic suspension system further comprises a hydraulic accumulator and at least one hydraulic suspension cylinder, the hydraulic accumulator being arranged in fluid communication with the at least one hydraulic suspension cylinder.

6. The dump truck of claim 5, the processing circuitry being further configured to:

control the hydraulic suspension system to feed liquid from a hydraulic fluid source to the hydraulic accumulator in response to the amount of hydraulic fluid exceeding a maximum hydraulic fluid limit of the hydraulic suspension cylinder.

7. The dump truck of claim 6, wherein the processing circuitry is further configured to:

determine, in response to the determined displacement, a minimum hydraulic pressure level in the hydraulic accumulator required to arrange the container at the desired position after the container receives the load, and control the hydraulic suspension system to feed hydraulic fluid from the hydraulic fluid source to the hydraulic accumulator until a hydraulic pressure level in the hydraulic accumulator reaches the minimum hydraulic pressure level.

8. The dump truck of claim 1, the processing circuitry being further configured to:

determine a position of the container relative to ground level after receiving the load, and control the hydraulic suspension system to drain liquid in response to the position of the container relative to the ground level being higher than a desired position relative to ground level after receiving the load.

9. The dump truck of claim 1, the processing circuitry being further configured to:

determine a position of the container relative to ground level after receiving the load, and control the hydraulic suspension system in response to the position of the container relative to the ground level being lower than a desired position relative to ground level after receiving the load.

10. A computer-implemented method of controlling a hydraulic suspension system for a dump truck, the method comprising:

determining, by processing circuitry of a computer system, a weight of a load to be received by a container of the dump truck; and controlling, by the processing circuitry, the hydraulic suspension system to raise the container a height as a function of the weight of the load to be received.

11. The method of claim 10, further comprising:

determining, by the processing circuitry, a desired position of the container relative to ground level, determining, by the processing circuitry, a displacement, relative to the desired position, of the container that would be caused by the load to be received by the container, determining, by the processing circuitry, in response to the determined displacement, an amount of liquid to feed to a hydraulic cylinder of the hydraulic suspension system to compensate for the displacement relative to the desired position caused by the load, and controlling, by the processing circuitry, the hydraulic suspension system for a time period allowing the amount of liquid to be fed to the hydraulic cylinder, the time period being determined so that the container is raised a distance corresponding to said displacement.

12. The method of claim 10, further comprising:

determining, by the processing circuitry, a position of the container relative to ground level after receiving the load, and controlling, by the processing circuitry, a drain valve of the hydraulic suspension system to be arranged in an open position to drain hydraulic fluid to a drain tank in response to the position of the container relative to the ground level being higher than a desired position relative to ground level.

13. The method of claim 10, further comprising:

determining, by the processing circuitry, the weight of the load to be received by the container from processing circuitry of a loading equipment having a bucket comprising the load.

14. A computer program product comprising a non-transitory computer-readable storage medium comprising program code for performing, when executed by the processing circuitry, the method of claim 10.

15. A non-transitory computer-readable storage medium comprising instructions, which when executed by the processing circuitry, cause the processing circuitry to perform the method of claim 10.

* * * * *